Patented Oct. 22, 1935

2,018,066

UNITED STATES PATENT OFFICE 2,018,066

TREATMENT OF HYDROCARBON OILS

Vladimir Ipatieff, Chicago, Ill., assignor to Universal Oil Products Company, Chicago, Ill., a corporation of Delaware No Drawing. Application March 7, 1935, Serial No. 9,831

3 Claims. (Cl. 196—10)

This invention relates particularly to the treatment of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum, in gas making processes and as by-products in various chemical industries. In general they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinic constituents. The manufacture of secondary alcohols such as iso-propyl alcohol and others by first absorbing the corresponding olefins in cracked gases in sulphuric acid and then hydrolyzing the acid esters has been undertaken to a limited extent. The olefins present in cracked hydrocarbon mixtures of gasoline boiling range are of moderately high antiknock value, but a certain percentage of these is too highly unsaturated, and these must be removed by chemical treatment, usually with sulphuric acid, to insure proper stability of the gasoline under storage conditions.

The present process provides for more effectively utilizing the olefinic constituents of commercial hydrocarbon mixtures, particularly those occurring in the gases from oil cracking processes to produce valuable derivatives therefrom and it may also be applied to individual olefins produced by special chemical methods or by fractionation of mixtures.

In one specific embodiment the invention comprises treatment of normally gaseous olefin hydrocarbons at elevated temperatures, to produce polymers therefrom utilizable as constituents of motor fuel, with solid contact materials or catalysts comprising a phosphoric acid and siliceous carrying or spacing materials of a porous and adsorptive character, while using regulated amounts of water or steam in the gas mixtures to control the composition of the acid and retard deterioration of catalyst activity.

The present process is particularly directed to the production of dimers and trimers from mono-olefins, particularly those olefins whose lower polymers boil at temperatures within the approximate range of commercial motor fuel, say, for example, from 100 to 400° F. It has been found that the dimers and some of the trimers of propylene, the butylenes and amylenes boil within this range and furthermore that these compounds have unusually high antiknock characteristics. The following table shows the approximate boiling points of the dimers of propylene, butylenes, amylenes and hexylenes which will occur in appreciable quantities in the gases from oil cracking processes.

*Boiling points of olefin dimers*

| | Degrees Fahrenheit |
|---|---|
| Hexylene (dimer of propylene) | 155 |
| Octylene (dimer or butylenes) | 255 |
| Decylene (dimer of amylenes) | 323 |
| Dodecylene (dimer of hexylenes) | 417 |

Of the lower boiling and normally gaseous olefins, ethylene is the most resistant to polymerization by catalysts of the present character, but in the presence of its higher homologs it is possible that a certain amount of mixed polymers are formed.

Polymers of higher molecular weight than the di- and tri-molecular compounds are generally of too high boiling point to be used in commercial gasolines and the end products of too extensive polymerization are resinous pitchy solids which are entirely unsuitable.

The essential ingredient of the solid catalysts which are employed in polymerizing olefins according to the present process is a phosphoric acid, which may constitute 80% or more of the original mixture, which is calcined to produce granules containing acid of maximum polymerizing effectiveness. Ortho-phosphoric acid ($H_3PO_4$) is generally suitable for use in the initial mixes on account of its polymerizing ability, its cheapness and the readiness with which it may be procured although the invention is not restricted to its use but may employ any of the other acids of phosphorus insofar as they are adaptable. Advantages are gained in the matter of time and convenience by employing the pyro acid in the primary mixes, since the acid in the final composites as shown by analysis approaches this compound in composition and less time is necessary in the calcining step to remove water. When using the pyro acid it is preferable to employ temperatures of from 250 to 350° F. in the original mixing step to insure thorough mixing since the pyro acid melts at 61° C. and does not attain its maximum fluidity until a temperature of about 120° C. is reached. As a general rule, when an equivalent degree of acid dehydration has been effected the polymerizing activity of catalyst composites will be approximately the same when similar proportions of acid and absorbent and the same type of absorbent is employed. However, the catalytic effectiveness is dependent to a considerable extent upon the details of operation employed in the preparation of the catalyst and slight variations have been noted when different acids were employed in the starting mixes. With definite variations in the final composition of the acid marked differences have been noted in the polymerizing effects.

The present invention is concerned with the use of ordinarily liquid phosphoric acids as polymerizing catalysts in substantially solid form, this being accomplished by the alternative use of a number of different absorbent carrying materials which vary somewhat in their absorptive capacity and also in their chemical and physical properties and their influence upon the catalytic effect of the mixtures. The absorbent materials which may be employed are divisible roughly into two classes. The first class comprises materials of a predominately siliceous character and includes diatomaceous earth, kieselguhr or infusorial earth and artificially prepared porous silica such as, for example, "Sil-O-Cel". In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica. In general siliceous or more specifically silica material may be employed in the preparation of the catalyst.

The second class of materials which may be employed either alone or in conjunction with the first class (and with certain other optional ingredients to be later described) comprises generally certain members of the class of aluminum silicates and includes such naturally occurring substances as the various fuller's earths and clays such as bentonite, Montmorillonite, etc. This class also includes certain artificially prepared aluminum silicates of which the product known as "Tonsil" is representative, this substance being in a sense a purified aluminum silicate made by treating certain selected clays with hydrochloric or other mineral acid and washing out the reaction products. The naturally occurring substances in this general class are characterized by a high adsorptive capacity which is particularly in evidence in making up the present types of phosphoric acid catalysts, and they may also contain traces of active ingredients which assist in producing the desired polymerizing effects. Again each substance which may be used alternatively will exert its own specific influence which will not necessarily be identical with that of the other members of the class.

In some cases the structure of the solid phosphoric acid catalyst may be improved by the primary incorporation of organic materials which yield a carbonaceous residue on heating. Substances which may be used in this manner include such materials as cellulose, starches, sugars, glue, gelatin, flour, molasses, agar-agar, etc. They evidently function as binders to some extent to prevent the breakdown of the catalyst structure when subjected to elevated temperatures and the action of hydrocarbon vapors or liquids in service.

The main feature of the present invention which stands as an improvement in the art of polymerizing gaseous olefins by catalysts, and more particularly by solid phosphoric acid catalysts, consists in the use of regulated amounts of water or steam in the gas mixtures undergoing polymerization to prevent or substantially retard the change in composition of the polymerizing acid by the gradual loss of water. When passing dry gas mixtures over solid phosphoric acid catalysts even at temperatures as low as 400–500° F., which is generally the preferred range to be used in connection with treatment of cracked gas mixtures, there is a gradual loss of water so that the acid which originally approached the pyro acid in composition ultimately contains some meta acid, which volatilizes and causes a loss of catalytic material as well as loss in catalytic efficiency since the meta acid is substantially ineffective in the present type of polymerization reaction.

When employing steam the vapor pressure of the acid at the operating temperature and pressure conditions is balanced by the steam in the gas mixture so that loss of water is prevented and the optimum acid composition is maintained. This has several advantages. In the first place the useful life of the catalyst is greatly extended as will be shown in later examples. Further than this, the use of considerably higher temperatures is made possible without danger of over-polymerization of the mono-olefins in gas mixtures and with the resultant increase in the throughput with any given apparatus. The third advantage is that there is less tendency for the deposition of carbon on the surface and in the pores of the catalyst granules, this accumulation of carbonaceous material being always the final determining factor in the life of this type of catalyst.

By the term aqueous fluid in the claims is meant water or steam or both.

The polymerizing of gaseous olefins with catalysts of the present character may be brought about under numerous combinations of temperature and pressure, though the best results for any given pure olefin or mixture of olefins such as those encountered in the gases from oil cracking plants, will usually correspond to a particular set of conditions, depending principally upon the percentage of propylene and higher molecular weight olefins in the gas. It is a feature of the present type of catalyst that treatments may be conducted at temperatures as high as 550 to 600° F. (the temperature range may be from 100° F.

to 600° F.) and superatmospheric pressures up to several hundred pounds per square inch without danger of over-polymerization resulting in the formation of heavy tar-like polymers instead of liquids of gasoline boiling range. The amount of steam by volume of the gas mixtures will usually be comprised within the range of 1% to 6%.

The equipment required in using the catalysts is generally simple, such as a tube or tower in which the catalyst is placed as a filling material. The gases to be polymerized, under sufficient pressure necessary for insuring their flow through the apparatus, are preferably preheated to a suitable temperature prior to passage through the catalyst mass. The catalyst chamber may be heated externally if desired, although as a rule this is not good practice on account of the difficulties in heat transmission through the bed of catalyst. A few test runs will usually determine the best conditions of operation. For example, if the temperatures and pressures employed are such that the products exist in vapor phase, the flow of the gases through the catalyst may be upward through filled towers while if liquids are condensed, the best results may be obtained when down flows are used so that liquid does not accumulate on the surface of the catalyst.

Solid phosphoric acid catalysts are characterized by their ability to polymerize olefins to produce relatively low boiling hydrocarbon polymers rather than heavy tars or pitches and by their long life due to the absence of such highly carbonaceous reaction products and also due to lack of oxidizing tendency in the phosphoric acid which constitutes the major portion thereof. In contrast to this it is notable that when employing sulphuric acid as a polymerizing agent, caution is necessary to prevent oxidation and undesirable side reactions such as ester formation and that, when employing metal halides such as aluminum chloride or zinc chloride, the tendency toward the formation of heavy polymers is pronounced. Furthermore, such catalysts are readily regenerated after they have been contaminated by surface carbon deposits after long periods of service by merely burning off the deposits with air or other oxidizing gas at moderate temperatures. A still further advantage resides in the fact that they are substantially of a non-corrosive character as compared with the decided corrosive action of liquid phosphoric acid and other liquid polymerizing agents. The peculiar structural strength of catalyst masses of the present type should be mentioned in connection with the general advantages which they possess, this being of special commercial value.

Apparently the use of air or other oxidizing gases long enough to substantially completely remove carbon from the surface and pores of the granules has the effect of increasing the ultimate porosity. Thus, temperatures as high as 950° F. are useful but are preferably not exceeded on account of the loss of meta acid by volatilization. It will be more or less obvious to those conversant with industrial operations that, in regenerating used catalysts which have been in contact with hydrocarbon materials, it would be good practice to first distill off all liquid hydrocarbons adhering to catalyst particles by the use of steam or other inert gas to avoid high temperatures in the burning step and lessen the total amount of coke deposits. It has been found in the case of the present type of catalyst that the best temperatures for removing absorbed liquid materials when using superheated steam are from approximately 600° to 700° F. and that down flows through catalyst beds are better than up-flows.

Another feature which may be employed to advantage in commercial work in both preparation and regeneration operations is to start with oxidizing gas mixtures containing less total oxygen than that normally present in air. As the more readily combustible substances are removed the percentage of oxygen is increased until the final gas mixture used is pre-heated air.

Use of temperatures as high as 950° F. in the burning of the catalyst inevitably dehydrates the phosphoric acid constituent to too great an extent and it is necessary to rehydrate the acid by the further use of steam, preferably at temperatures within the approximate range of 450 to 500° F., which evidently reforms the acid corresponding to the greatest catalytic effectiveness.

A considerable amount of commercial data is available to indicate the improved efficiency obtainable by supplementing the normal polymerization of olefin-containing gas mixtures in the presence of solid phosphoric acid catalysts by the use of steam but the following will be sufficiently illustrative. It is not intended, however, to limit the invention to the exact numerical data introduced.

To show the advantage of adding regulated quantities of steam to gas mixtures undergoing polymerization four towers containing the same freshly prepared solid phosphoric acid catalyst were operated in parallel upon a gas from the stabilizer of a cracking plant, the gas containing approximately 30% by volume of propylene and higher olefins. The towers were all operated on the down-flow principle at a temperature of 450° F., 100 pounds per square inch super-atmospheric pressure and the same space velocity.

In tower #1 the gas mixture was passed without the addition of steam. In tower #2, 1% of steam was added; in tower #3, 3%; and in tower #4, 6%. Initially there was an 80% removal of propylene and higher olefins by all four towers as indicated by analysis of the inlet and outlet gases. After seven days of continuous operation it was noted that the percentage of olefin removal had dropped to 40 in the first tower, while no change was noticed in towers 2, 3 and 4. After another seven days of operation the percentage of removal in tower #1 was down to 20 and not commercially practicable. Tower #2 had dropped to a 70% removal, while towers 3 and 4 were still substantially as active as at the beginning of the run. After another week of operation tower #2 was down to a 60% removal and tower #3 began to shown signs of deterioration, probably due principally to the gradual accumulation of carbonaceous residues on the catalyst granules. Tower #4, however, was still active and showed no diminution of catalytic activity after 25 days of service.

From the above data it will be seen that with the gas mixture employed the optimum percentage of steam was somewhere between 3 and 6% by volume. This percentage will necessarily be varied in case of gas mixtures containing varying percentages of higher olefins and will also be influenced between the temperature or infusorial earth and pressure found most suitable for the economical removal of olefins from different cracked gas mixtures.

The essential character of the present invention and its practical value will be seen from the preceding specification and numerical data introduced, although it is not intended to limit its scope in exact correspondence therewith.

I claim as my invention:

1. A process for the conversion of normally gaseous olefins into liquid hydrocarbons which comprises subjecting olefinic gas under polymerization conditions of temperature and pressure to the action of a solid phosphoric acid catalyst in the presence of an added amount of steam such that the vapor pressure of the acid at the operating temperature and pressure conditions is balanced by the steam in the gas so that loss of water from the catalyst is substantially prevented.

2. A process for the conversion of normally gaseous olefins into liquid hydrocarbons which comprises subjecting olefinic gas at polymerizing temperature to the action of a solid catalyst containing pyro-phosphoric acid, in the presence of a sufficient quantity of added aqueous fluid to substantially prevent conversion of said acid to meta-phosphoric acid.

3. A process for the conversion of normally gaseous olefins into liquid hydrocarbons which comprises subjecting olefinic gas at polymerizing temperature to the action of a solid phosphoric acid catalyst in the presence of added aqueous fluid in the amount of at least 1% and not substantially exceeding 6% by volume of the olefinic gas.

VLADIMIR IPATIEFF.